United States Patent [19]

Dietz

[11] Patent Number: 4,645,985
[45] Date of Patent: Feb. 24, 1987

[54] S-CORRECTION CIRCUIT FOR A VIDEO DISPLAY

[75] Inventor: Wolfgang F. W. Dietz, New Hope, Pa.

[73] Assignee: RCA Corporation, Princeton, N.J.

[21] Appl. No.: 833,028

[22] Filed: Feb. 26, 1986

[51] Int. Cl.[4] .................................... H01J 29/56
[52] U.S. Cl. ........................................... 315/371
[58] Field of Search ..................... 315/370, 371, 408

[56] References Cited

U.S. PATENT DOCUMENTS

| | | |
|---|---|---|
| 3,428,853 | 2/1969 | Akatsu . |
| 4,423,358 | 12/1983 | den Hollander . |
| 4,468,593 | 8/1984 | Haferl . |
| 4,501,995 | 2/1985 | Olmstead et al. . |
| 4,516,058 | 5/1985 | Haferl . |
| 4,533,855 | 8/1985 | Willis et al. . |

Primary Examiner—Theodore M. Blum
Attorney, Agent, or Firm—Eugene M. Whitacre; Joseph J. Laks; Sammy S. Henig

[57] ABSTRACT

An automatic S-correction circuit for a deflection circuit includes an active source of generally sawtooth current having an amplitude that is proportional to the deflection frequency. The sawtooth current and a deflection current that flows in a deflection winding are combined as a current flowing in an S-capacitor that develops a parabolic voltage. The amplitude of the parabolic voltage is automatically adjusted to be at a level that is required for maintaining proper S-correction for any deflection frequency within a continuous, wide range of frequencies.

20 Claims, 12 Drawing Figures

S-CORRECTION CIRCUIT FOR A VIDEO DISPLAY

The invention relates to a deflection circuit arrangement that includes S-correction.

In television kinescopes or picture tubes in which an electron beam is deflected by a magnetic field generated by the flow of the deflection current in a deflection winding, certain nonlinearities of the generated raster appear. One type of nonlinearity is attributable to the fact that the effective center of deflection of the electron beam is not coincident with the center of radius of curvature of the screen of the kinescope. The distance from the center of deflection to the edges of the kinescope screen is greater than the distance to the center of the kinescope screen.

As a result of this source of nonlinearity, the deflection of the electron beam as a function of time, as seen on the raster displayed on the screen of the kinescope, becomes progressively greater near the edges of the screen. Since the information to be displayed in a television system is encoded at a constant rate, the information as displayed on the screen will appear to become compressed in the center of the raster and stretched near the edges.

A common method of compensating for the nonlinearity is to place an "S", or trace, capacitor in series with the deflection winding. Typically, the S-capacitor is conductively connected to a B+ energizing voltage through an inductance having a low resistance. Thus, the average DC voltage across the S-capacitor is equal to the B+ energizing voltage. During trace, the voltage across the S-capacitor determines the rate of change of the deflection current in the deflection winding. With the addition of the S-capacitor, the deflection current, rather than being a substantially linear ramp during the recurrent scanning intervals, becomes a segment of a sinewave having a reduction in the rate of change of deflection current at the positive and negative extremes of the deflection current relative to that at the center. This in turn creates a slight reduction in the rate of scanning of the electron beam near the left and right edges of the raster relative to the center and a reduction in the stretch nonlinearity.

In a typical deflection circuit output stage, the deflection current charges the trace capacitor during one half of trace and discharges it during the other half. Consequently, the voltage across the trace capacitor varies in a parabolic manner during trace such that in the center of trace the rate of change of the voltage across the trace capacitor is zero. The extent of change of the parabolic voltage across the trace capacitor from, illustratively, the beginning of trace to the center of trace, determines the extent of S-correction provided by the trace capacitor. The capacitance of the S-capacitor is carefully chosen, taking into account the inductance of the deflection winding and the scan rate, in order to provide the desired deflection current waveform for a particular application.

In television monitors or graphic display units in which the capability of operating at any one of different scan rates from a wide range of scan frequencies is desired, the B+ energizing voltage that is conductively coupled to the S-capacitor is, typically, increased as the scan rate is increased so as to maintain the same amplitude of the deflection current.

It may be desirable to vary automatically the amplitude of the parabolic voltage in the S-capacitor as the scan rate, that is selected from a continuous wide range of frequencies, varies, such that proper S-correction is maintained for each scan rate selected from such range of frequencies. For example, it may be desirable to maintain the ratio between the peak-to-peak amplitude of the parabolic voltage and the average DC voltage across the S-capacitor the same for different scan rates.

As explained before, the B+ energizing voltage that forms the DC average voltage across the S-capacitor is, typically, increased for operation at higher scan rates. On the other hand, in a typical deflection circuit, the peak-to-peak voltage across the S-capacitor that is developed for a given amplitude of the deflection current, disadvantageously, decreases, when the scan rate increases. The voltage across the S-capacitor decreases because the impedance of the S-capacitor is inversely proportional to the scan rate. Thus, without resorting to a different approach for developing the parabolic voltage, the ratio that was discussed before will not remain the same as the scan rate changes.

In accordance with an aspect of the invention, a deflection current at a deflection frequency is generated in a deflection winding. The deflection frequency is selected from a range of frequencies. An active source of current responsive to an input signal supplies, in accordance with the frequency of the input signal, a substantially sawtooth first current. The first current has an amplitude that is proportional to the frequency of the deflection current. The first current develops a parabolic voltage that is coupled to the deflection winding to provide, automatically, the required S-correction.

In a deflection circuit, embodying aspects of the invention, the first current is summed up with the deflection current to form a combined current at the deflection rate that flows in a trace, or S-capacitor and that results in the development of an S-correction parabolic voltage in the S-capacitor that may be of a fixed capacitance. The average, DC voltage in the S-capacitor is equal substantially to a B+ energizing voltage that energizes the deflection circuit. The ratio between the parabolic voltage and the average DC voltage in the S-capacitor is automatically maintained to be substantially the same for any deflection frequency selected from the range of frequencies. In contrast, in some prior art circuits, variations in the parabolic voltage are obtained by changing the capacitance of the S-capacitor that is a passive component.

Figure 1:
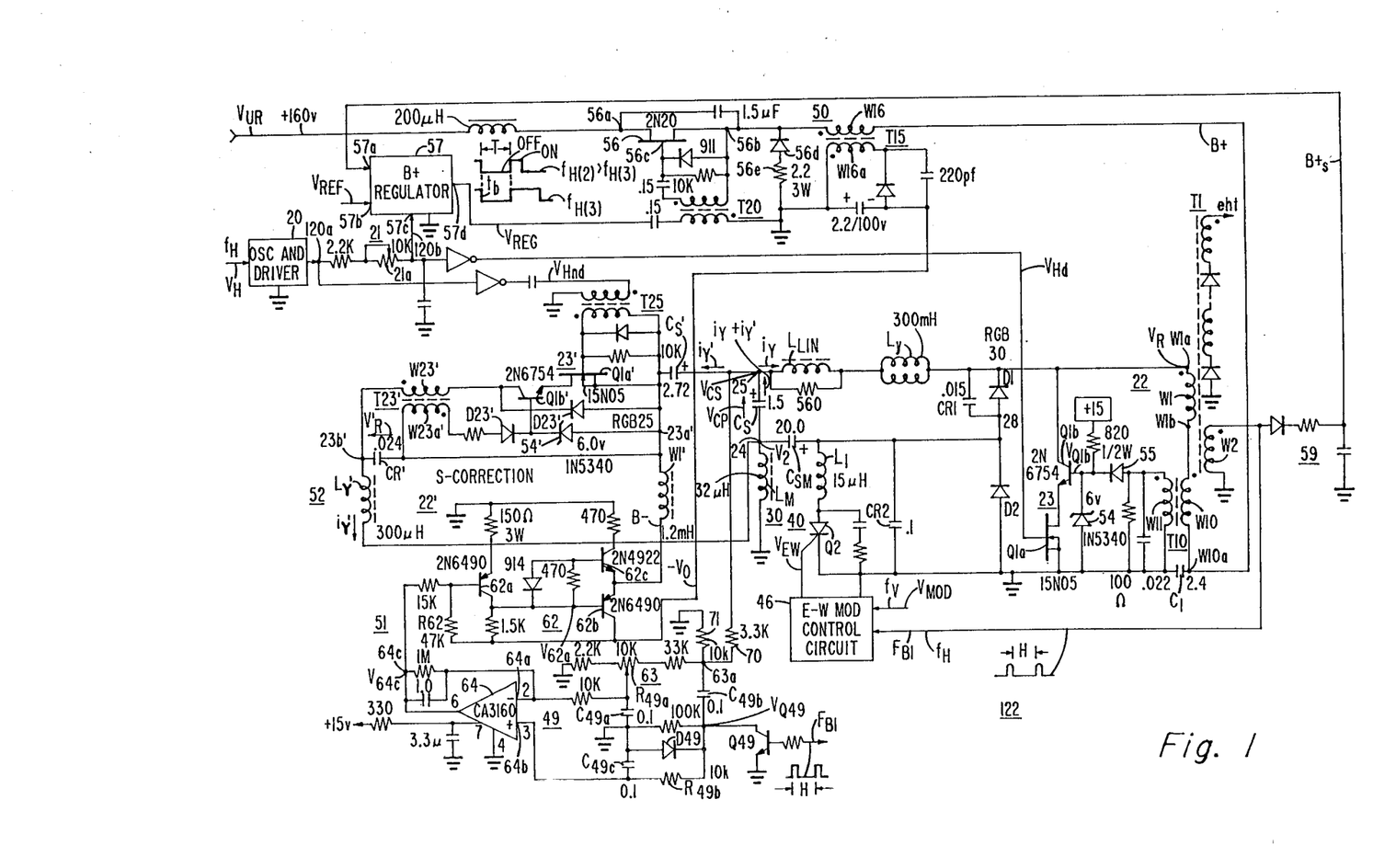
FIG. 1 illustrates a deflection system that automatically maintains the same ratio between a parabolic voltage and a DC voltage that are developed at a terminal of a trace capacitor in any deflection frequency selected for operation from a range of frequencies.

FIG. 1 illustrates a horizontal deflection system 122 of, for example, a television monitor that includes an output stage 22 that is energized by an energizing voltage B+. Output stage 22 generates a generally sawtooth deflection current $i_y$ at a deflection frequency $f_H$, the scan rate, that flows in, an S, or trace, capacitor $C_s$ during each deflection interval H.

An oscillator and driver unit 20 receives a synchronizing signal $V_H$ at horizontal frequency $f_H$ from a synchronizing signal separator, not shown, that separates horizontal synchronizing signals from an incoming video signal. Unit 20 supplies an output signal 120a at the frequency $f_H$ that is coupled through an adjustable delay unit 21 to provide a delayed signal $V_{Hd}$ at the frequency $f_H$ at the gate of an FET switch Q1a of a cascode switch arrangement 23 of output stage 22. Signal $V_{Hd}$ causes switch Q1a to conduct from a time that occurs shortly prior to the center of the horizontal trace interval until switch Q1a becomes non-conductive, for initiating the retrace interval, at the end of the horizontal trace interval. A main current conducting electrode of FET switch Q1a is coupled to the emitter electrode of a transistor switch Q1b of cascode switch arrangement 23. The collector of transistor switch Q1b is coupled to an end terminal W1a of a primary winding W1 of a flyback transformer T1. The other end terminal of winding W1, a terminal W1b, is coupled to one end terminal of a primary winding W10 of a current transformer T10. The other end terminal of winding W10, a terminal W10a, is coupled to a filter capacitor C1 and to a source of energizing voltage B+.

A positive voltage $V_{Q1b}$, at the base electrode of transistor switch Q1b, is developed across a zener diode 54. At the beginning of retrace, when transistor switch Q1b becomes nonconductive, zener diode 54 prevents base voltage $V_{Q1b}$ from exceeding the breakdwon voltage of zener diode 54. During trace, the current in winding W10 of transformer T10 induces a voltage in a secondary winding W11 that causes a diode 55 to be forward biased. During trace, voltage $V_{Q1b}$ is coupled from a forward biased diode 55 that rectifies voltage across a secondary winding W11 of transformer T10. Transistor switch Q1b is switched on when FET switch Q1a is conductive.

Output stage 22 produces deflection current $i_Y$ in a horizontal deflection winding $L_y$ that is series coupled with a linearity inductor $L_{LIN}$. During the first half of trace, current $i_Y$ flows between a junction terminal 25 and terminal W1a, in a direction that is opposite to that pointed by the arrow. During the second half of trace, current $i_Y$ flows in the direction that is pointed by the arrow.

"S" shaping of the horizontal deflection current $i_Y$ is produced, in part, by trace capacitor $C_s$ having one plate that is coupled to terminal 25, as described later on. Energy losses are replenished from voltage B+ through transformer windings W10 and W1 such that the average, DC voltage of voltage $V_{cs}$ at terminal 25 is equal to voltage B+. The other plate of capacitor $C_s$, at a terminal 24, is coupled to a side pincushion modulation inductor $L_M$. One plate of a first retrace capacitor CR1 is coupled to terminal W1a of transformer winding W1. The other plate of capacitor CR1 is coupled at a terminal 28 to a plate of a second retrace capacitor CR2. The other plate of capacitor CR2 is coupled to a reference potential such as ground. A damper diode D1, coupled across the plates of retrace capacitor CR1, is poled to conduct current from junction terminal 28 to terminal W1a of winding W1. A damper diode D2, coupled across the plates of retrace capacitor CR2, is poled to conduct current from the reference potential to junction terminal 28. Diodes D1 and D2 clamp the voltage at terminal W1a to approximately the reference potential during the first half of the trace interval; whereas cascode switch arrangement 23 clamps it to approximately the reference potential during the second half of the trace interval.

An inside-outside pincushion correction circuit 30, that includes inductor $L_M$, is coupled to junction terminal 24 that is between modulation inductor $L_M$ and trace capacitor $C_S$. Circuit 30 includes a modulation capacitor $C_{SM}$ that is coupled between terminals 24 and 28 to form a first branch. Inductor $L_M$ forms a second branch of circuit 30. The plate of capacitor $C_{SM}$ at termianl 28 is coupled to a controllable switch 40. Controllable switch 40 includes a small-valued inductor L1, interposed between terminal 28 and the anode of an SCR switch Q2. SCR switch Q2 couples, in its conductive state, junction terminal 28, through inductor L1, to the reference potential. Controllable switch 40 is controlled by an East-West control circuit 46 that supplies the gate turn-on voltage of SCR switch Q2.

Control circuit 46 is coupled to winding W2 of horizontal flyback transformer T1 for receiving a synchronizing signal $F_{B1}$ at the horizontal deflection rate $f_H$. Control circuit 46 is also coupled to an output terminal of a vertical deflection generator, that is not shown in FIG. 1, for receiving a vertical rate signal $V_{mod}$ at the frequency $f_v$. Control circuit 46 generates an output signa $V_{EW}$ having a leading, or positive-going, edge that occurs in each horizontal cycle during the second half of a corresponding retrace pulse $V_R$. Each leading edge turns on SCR switch Q2. SCR switch Q2 is turned-on, during the retrace interval, at an instant that occurs progressively earlier from the beginning to the middle of a vertical scan, and progressively later from the middle to the end of a vertical scan.

Pincushion correction circuit 30 comprises a switch-variable impedance coupled in series with deflection winding $L_y$ and operates in a known way. When SCR switch Q2 is non-conductive, pincushion correction circuit 30 substantially presents high inductive impedance in the form of modulation inductor $L_M$ in the current path formed by deflection winding $L_y$. During the horizontal retrace interval, when SCR switch Q2 is conductive, circuit 30 presents a low capacitive impedance of capacitor $C_{SM}$ in the deflection current path of deflection winding $L_Y$. This arrangement corrects for both inside and outside pincushion distortion. Capacitor $C_{SM}$ causes a voltage $V_2$, at terminal 24, to provide additional S-correction. Voltage $V_2$ across inductor $L_M$ is combined in series with the voltage across trace capacitor $C_S$ to vary the waveform of deflection trace current $i_Y$ to provide inside pincushion correction.

Output stage 22 is capable, advantageously, of producing deflection current $i_Y$ of substantially the same predetermined amplitude for any given frequency $f_H$ of synchronizing signal $t_H$ that is selected from a range of frequencies. Frequency $f_H$ may be selected from a range of frequencies that is, illustratively, between 15,625 Hz, the horizontal frequency in a PAL standard, and 31,250 Hz. Controlling the amplitude of deflection current $i_Y$ is accomplished by automatically increasing voltage B+ when the frequency $f_H$ increases, and vice versa, so as to maintain constant amplitude of deflection current $i_Y$, as described below.

Voltage B+ is controlled by a regulated supply 50, operating in a closed-loop configuration that varies voltage B+ in accordance with a signal B+$_s$. Regulated supply 50 comprises a series pass transistor switch 56 operating with a duty cycle that is controlled by a B+ regulator circuit 57. A current conducting terminal 56a of switch 56 is coupled to an unregulated DC voltage $V_{UR}$. The other current conducting terminal, a terminal 56b, is coupled via an inductance W16 of a transformer T15 to terminal W10a. The cathode of flywheel diode 56d is coupled to terminal 56b. The anode of diode 56d is coupled to ground via a current limiting resistor 56e. Terminal W10a is coupled to filter capacitor C1 for producing voltage B+. B+ regulator circuit 57 receives, at an input terminal 57c, a timing signal 120b at the frequency $f_H$. Regulator circuit 57 produces, at an output terminal 57d, a rectangular waveform signal $V_{REG}$ at the frequency $f_H$ that is synchronized with timing signal 120b.

Consider, for the sake of explanation, the open loop operation of B+ regulator circuit 57. In the open loop operation, the duration of the "off" state of signal $V_{REG}$ is independent of the frequency $f_H$, whereas the period between consecutive cycles, is equal to the period of signal $V_H$. Thus, the duty cycle, or the ratio between the duration of the "on" state to that of the entire period, increases as the frequency $f_H$ decreases. Signal $V_{REG}$ is coupled by a transformer T20 to a control electrode 56c of switch 56. During the "off" state of signal $V_{REG}$, switch 56 is conductive. During the "on" state of signal $V_{REG}$, switch 56 is nonconductive and flywheel diode 56d is conductive. The open loop operation of B+ regulated supply 50 is such that the higher the frequency $f_H$ is, the larger is voltage B+. The increase in voltage B+ counteracts the tendency of deflection current $i_Y$ to decrease, when the frequency $f_H$ increases, for example. It should be understood that, in some applications, such open loop configuration of supply 50 may provide the required variation of voltage B+ as a function of frequency $f_H$, especially in such monitor applications in which frequency $f_H$ varies within a narrow range of frequencies.

In the closed-loop operation that is employed in the circuit of FIG. 1, B+ regulator circuit 57 receives an, illustratively, DC constant reference signal $V_{REF}$ at a terminal 57b and signal $B+_s$ at a terminal 57a that is indicative of the amplitude of deflection current $i_y$. Regulator circuit 57 varies the duty cycle of signal $V_{REG}$, in accordance with the difference between signals $V_{REF}$ and $B+_s$, to obtain a corresponding variation in voltage B+ that maintains deflection current $i_Y$ at substantially the same amplitude when the frequency $f_H$ changes. A peak detector 59 generates signal $B+_s$ that is indicative of the positive peak of signal $F_{B1}$. Signal $F_{B1}$ is developed across winding W2 of transformer T1. The positive peak of signal $F_{B1}$, that occurs at the center of retrace, is indicative of the amplitude of deflection current $i_Y$.

An auxiliary S-correction circuit 52 of FIG. 1, embodying the invention, includes an output stage 22' that generates, in a manner that is described later on, a generally sawtooth auxiliary current $i_Y'$ at the frequency $f_H$ having an amplitude that is inversely proportional to frequency $f_H$. Current $i_Y'$ flows in trace capacitor $C_S$. The current that flows in capacitor $C_s$ is equal to the algebraic sum of currents $i_Y$ and $i_Y'$. Currents $i_Y'$ and $i_Y$ have a phase difference that is close to 180°.

FIGS. 2a–2e are used for explaining the operation of system 122 of FIG. 1 when the deflection frequency is $f_{H(2)}$, illustratively 31250 KHz. FIGS. 3a–3e are used for explaining the operation, when the deflection frequency, $f_{H(3)}$ is lower than $f_{H(2)}$ and equals, illustratively, 15625 KHz. Similar numbers and symbols in FIGS. 1, 2a–2e and 3a–3c, indicate similar items or functions.

Figure 2:
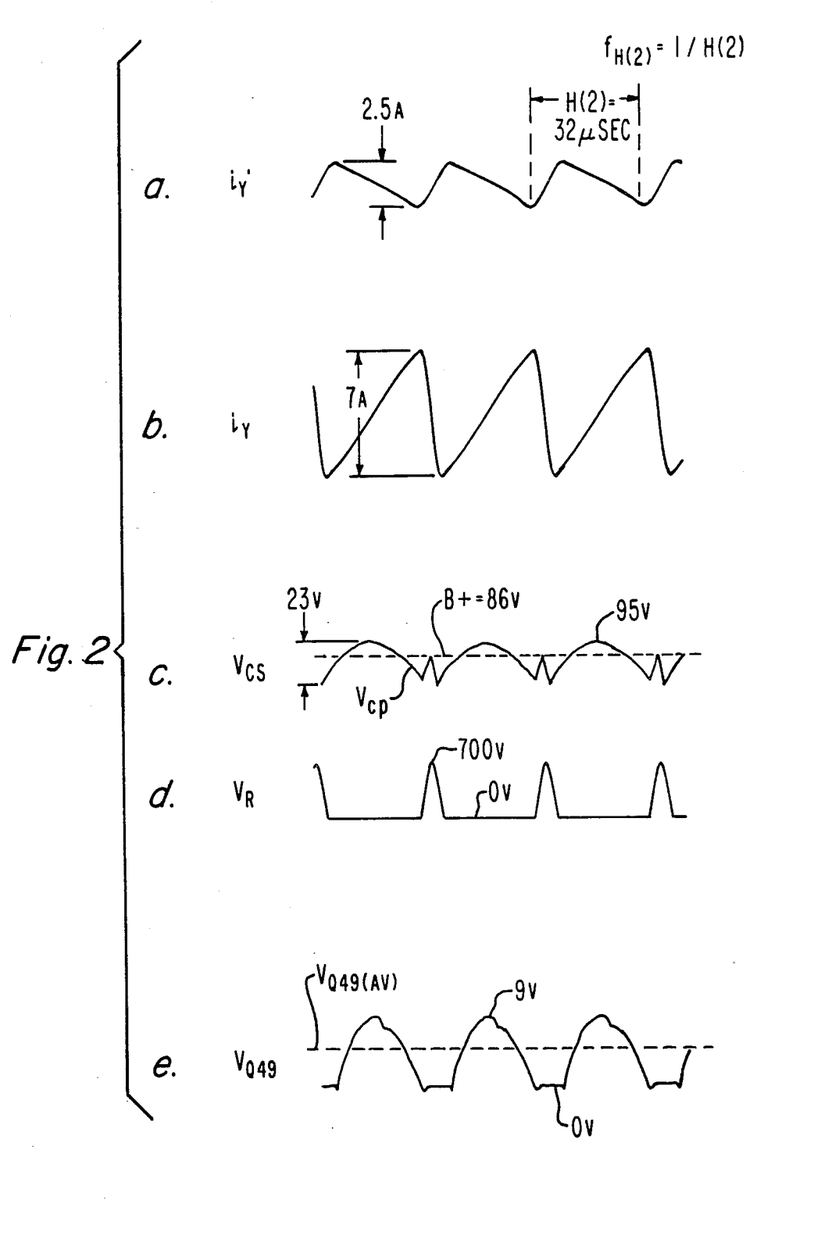
FIGS. 2a–2e illustrate, for a first example, waveforms useful in explaining the operation of the system of FIG. 1.
Figure 3:
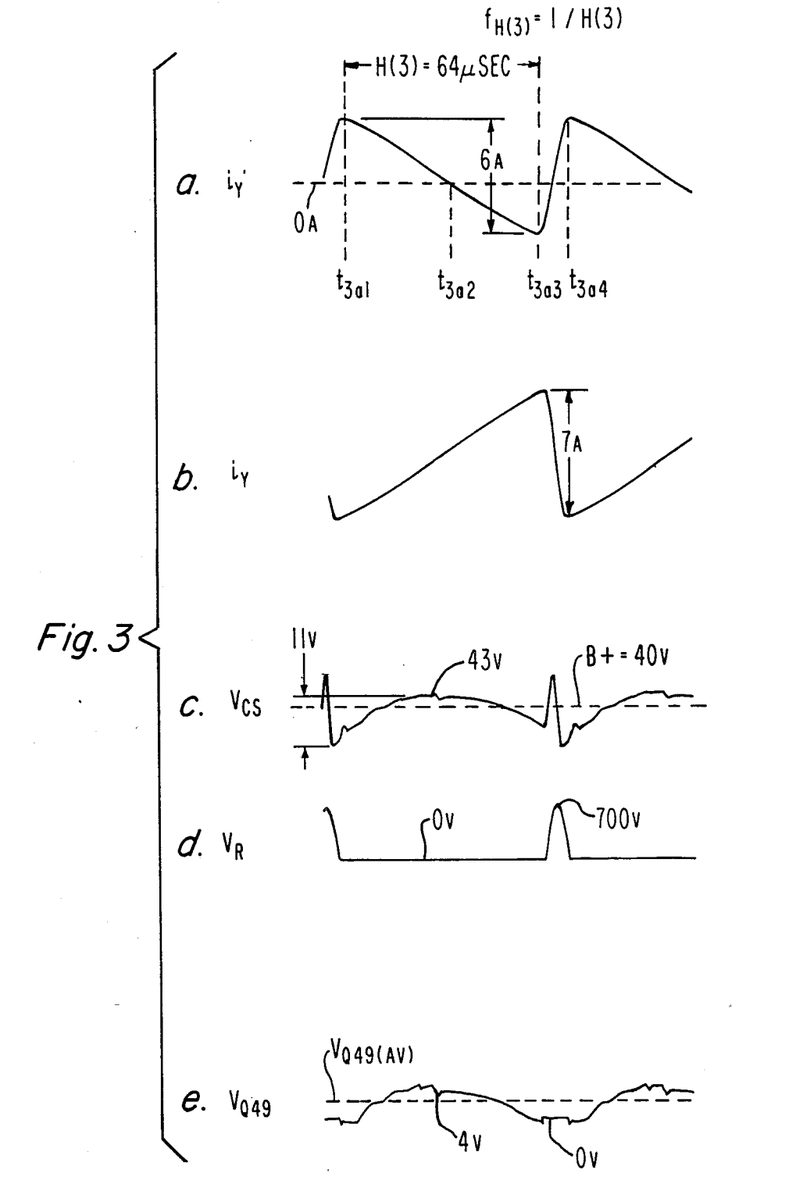
FIGS. 3a–3e illustrates, for a second example, waveforms useful in explaining the operation of the system of FIG. 1 in which the selected deflection frequency is lower than in the first example.

Currents $i_Y'$ and $i_Y$ that are illustrated in, for example, FIGS. 2b and 2a, respectively, and that flow in capacitor $C_s$ of FIG. 1 produce a parabolic voltage $V_{cp}$. The waveform of voltage $V_{cp}$ that is developed in trace capacitor $C_s$ is illustrated in, for example, FIG. 2c. The amplitude of deflection current $i_Y$ of each of FIGS. 2b and 3b is maintained substantially the same for each of deflection frequencies $f_{H(2)}$ and $f_{H(3)}$ by controlling energizing voltage B+ of FIG. 1, as described before. For example, when operating at deflection frequency $f_{H(2)}$ that is higher than deflection frequency $f_{H(3)}$, voltage B+ is higher. On the other hand, the peak-to-peak amplitude of current $i_Y'$ is made to be inversely proportional to frequency $f_H$.

In accordance with an aspect of the invention, currents $i_Y'$ and $i_Y$ are algebraically summed to develop parabolic voltage $V_{cp}$ in capacitor $C_s$ and a parabolic voltage $V_{cs}$ at terminal 25. The amplitude of current $i_Y'$ is controlled in such a way that the ratio between the peak-to-peak amplitude of parabolic voltage $V_{cp}$ and the average DC voltage that is developed in capacitor $C_s$ and that is equal to voltage B+ is maintained the same for each scan frequency $f_H$. Such ratio in the examples of each of FIGS. 2c and 3c is equal approximately to $\frac{1}{4}$ and is substantially independent of the selected frequency $f_H$.

In carrying out an aspect the invention, the phase of current $i_Y'$ of, for example, FIG. 2a is close to 180° out-of-phase, relative to that of current $i_Y$ of FIG. 2b. However, it should be understood that other phase relationships may be employed. When frequency $f_H$ increases, the peak-to-peak amplitude of auxiliary current $i_Y'$ decreases so as to increase the amplitude of parabolic voltage $V_{cp}$ of FIG. 1 in proportion to the increase in the energizing voltage B+. As indicated before, voltage B+ is increased when frequency $f_H$ increases in order to maintain the amplitude of current $i_Y$ the same. Thus, the amplitude of current $i_Y'$ of FIG. 2a is smaller than that of FIG. 3a; whereas current $i_Y$ of FIGS. 2b and 3b are substantially of the same amplitudes.

A cascode switch arrangement 23' of output stage 22' of auxiliary S-correction circuit 52 is controlled by a switching signa $V_{Hnd}$ that is coupled via a transformer T25. Signal $V_{Hnd}$ has a waveform that leads that of signal $V_{Hd}$. A damper diode D23' is coupled in parallel with switch arrangement 23'. The parallel arrangement of diode D23' and arrangement 23' is coupled via a primary winding W23' of a transformer T23' between a terminal 23a' and a terminal 23b'. A retrace capacitor CR' is coupled between terminals 23a' and 23b'. A coupling capacitor $C_s'$ is coupled between terminal 23a' and terminal 25 for coupling auxiliary current $i_Y'$ to S-capacitor $C_s$. A negative energizing voltage B— is coupled via a choke W1' to terminal 23a'. An inductance $L_y'$ is coupled between terminal 23b' and terminal 24, the junction of S-capacitor $C_s$ and side pincushion modulator inductor $L_M$. Inductance $L_y'$ and capacitor CR' form a retrace resonant circuit.

During, for example, interval $t_{3a1}$–$t_{3a2}$ of FIG. 3a, diode D23' of FIG. 1 is conductive and current $i_Y'$ of FIG. 3a that flows in each of capacitor $C_s'$ of FIG. 1, and inductance $L_y'$ is downramping. During interval $t_{3a2}$–$t_{3a3}$ of FIG. 3a, switch arrangement 23' of FIG. 1, that includes an FET transistor a1a' in series with a bipolar transistor Q1b', is conductive and current $i_Y'$ of FIG. 3a that is at the opposite polarity continues flowing in a downramping manner. When switch 23' is conductive, the base electrode voltage transistor Q1b' of switch 23' is developed across a zener diode 54'. Zener diode 54' prevents the base electrode voltage of transistor Q1b' from exceeding the breakdown voltage of zener diode 54'. The current flowing in a primary winding W23' of a transformer 23' induces a voltage at a secondary winding W23a' that is rectified by a diode D23' for developing the voltage at the base electrode of transistor Q1b'. Note that the voltage that is applied across the series arrangement of winding W23' and inductor $L_y'$ when either switch 23' or diode D23' is conductive is equal to the algebraic sum of voltages $V_{cs}$ and $V_{cs}'$.

Prior to the retrace interval of output stage 22 of FIG. 1, switch arrangement 23' becomes nonconductive, in accordance with signal $V_{Hnd}$ that is coupled to transformer T25 to the back electrode of transistor Q1a' and includes a voltage at a source of winding W23a' that is rectified by a diode D23' for developing the voltage at the base electrode of transistor Q16'. Note that voltage that is applied across inductor $L_y'$ by switch 23' is equal to algebraic sum of voltage $V_{cs}$ and $V_{cs}'$ that leads signel $V_H$. When switch arrangement 23' becomes nonconductive, a retrace volta $V_R'$ is developed across capacitor CR'. Voltage $V_R'$ generates current i$y'$ in the interval $t_{3a3}$–$t_{3a4}$ of FIG. 3a. Thus, the switching operation of switch arrangement 23' of FIG. 1 that is controlled by signal $V_{Hnd}$ produces auxiliary current i$y'$ that flows in inductance $L_y'$ and in capacitor $C_s'$. The amplitude of current i$y'$ is determined by the level of voltage B− that is negative. The more negative voltage B− is, the larger is the peak-to-peak amplitude of current i$y'$.

Circuit 52 that generates current i$y'$ operates as a controlled current source that is coupled between terminals 24 and 25, and in parallel with capacitor $C_s$. Because current i$y'$ is coupled to both terminals 24 and 25, inductor $L_M$ is not coupled in the current path of current i$y'$. Therefore, advantageously, current i$y'$, that generates voltage $V_{cp}$, does not affect the voltage across inductance $L_M$ that is used for east-west correction.

In accordance with a further aspect of the invention, a regulated supply 51 that is included in circuit 52 controls the level of energizing voltage B−. Voltage B−, that is negative relative to ground potential, controls the amplitude of current i$y'$ that is generated by output stage 22'. Voltage B− becomes, illustratively, less negative when the frequency $f_H$ increases. When voltage B− becomes less negative, the amplitude of auxiliary current i$y'$ decreases and that of parabolic voltage $V_{cp}$ in S-capacitor $C_s$ increases. Regulated supply 51 that controls the level of voltage B− includes a drive stage 62 that is controlled in a feedback loop by a control circuit 49, embodying an aspect of the invention.

During trace, voltage $V_{cs}$ at terminal 25 includes the sum of AC parabolic voltage $V_{cp}$, and of a DC voltage of magnitude equal to energizing voltage B+, as illustrated in each of FIGS. 2c and 3c. Voltage $V_{cs}$ is divided down in voltage at a terminal 63a by resistors 70 and 71, filtered by a low-pass filter 63 and then coupled to an inverting input terminal 64a of a differential amplifier 64. Filter 63 includes a capacito $C_{49a}$ that filters out the AC voltage component that is present in voltage $V_{cs}$.

An adjustable resistor $R_{49a}$ of filter 63 couples an adjustable portion of the DC voltage component of voltage $V_{cs}$ to inverting input terminal 64a. A capacitor $C_{49b}$, couples a portion of parabolic voltage $V_{cp}$, shown in, for example, FIG. 2c or 3c via terminal 63a of FIG. 1 to the cathode of a clamping diode D49. As a result of the clamping operation of diode D49, a voltage $V_{Q94}$ is developed across diode D49, having a waveform that is illustrated in FIG. 2e or 3e. The DC portion, or an average value $V_{Q49(AV)}$, of voltage $V_{Q49}$ is proportional to the peak-to-peak amplitude of voltage $V_{cp}$. Voltage $V_{Q49(AV)}$ is coupled to a noninverting input terminal 64b of amplifier 64. Resistor $R_{49b}$ and capacito $C_{49c}$ form a filter that filters out the AC voltage component from voltage $V_{Q49}$ for producing voltage $V_{Q49(AV)}$.

Differential amplifier 64 produces a control voltage $V_{64c}$ that is respresentative of the difference between the peak-to-peak amplitude of voltage $V_{cp}$ and the magnitude of voltage B+. Voltage $V_{64c}$ controls the amplitude of auxiliary current i$y'$ by controlling the level of voltage B− in such a way that, for each scan frequency $f_H$, the voltages at terminals 64a and 64b of amplifier 64 are substantially equal. As previously noted, the peak-to-peak amplitude of parabolic voltage $V_{cp}$ is determined by the amplitude of current i$y'$. By maintaining the voltages at terminals 64a and 64b equal, control circuit 49 causes the ratio between parabolic voltage $V_{cp}$ and energizing voltage B+ to remain the same for each scan frequency $f_H$. By maintaining such ratio the same, proper S-correction is provided across the entire operating range of scan frequencies $f_H$.

Control voltage $V_{64c}$ of amplifier 64 is coupled in drive stage 62 to the base electrode of a transistor 62a operating as a phase inverter. A negative voltage $-V_0$ that supplies the energy to drive stage 62 is also coupled to the base electrode of a transistor 62a through a resistor R62 for shifting the level of voltage $V_{64c}$ that is positive to form at the base electrode of transistor 62a a base voltage that is negative. Transistor 62a operates as a phase inverter. When voltage $V_{64c}$ of amplifier 64 becomes, for example, less positive, the voltage at the collector of transistor 62a becomes less negative.

The voltage at the collector of transistor 62a is coupled through a push-pull emitter follower stage that includes transistors 62b and 62c to provide a negative voltage B− at the respective emitters of transistors 62b and 62c. Thus, voltage B− that controls the amplitude of current i$y'$ is controlled by voltage $V_{64c}$ of amplifier 64.

In accordance with a feature of the invention, voltage $V_{cp}$ is regulated in a feedback control loop that utilizes analog techniques. When frequency $f_H$ gradually changes, voltage B−, current i$y'$ and voltage $V_{cp}$ are also changed in a correspondingly gradual manner. Thus, S-correction is maintained without discontinuity in the entire range of frequencies of frequency $f_H$.

When frequency $f_H$, for example, increases, the average value of voltage $V_{cs}$ at terminal 25 increases because voltage B+ is increased, as described before. An increase in the average value of voltage $V_{cs}$ causes the voltage at terminal 64a of amplifier 64 to be more positive. Therefore, voltage $V_{64c}$ at output terminal 64c becomes more negative. The result is that voltage B− becomes less negative. It follows that the amplitude of auxiliary current i$y'$ becomes smaller. Because the amplitude of current i$y'$ is smaller, the net current in capacitor $C_s$ has a higher amplitude. Therefore, the amplitude of parabolic voltage $V_{cp}$ or $V_{cs}$ increases, causing voltage $V_{Q49(AV)}$ at input terminal 64b of amplifier 64 to be more positive and to approach the level of the voltage at input terminal 69a. The feedback loop is at steady state when the voltages at terminals 64a and 64b are equal. Thus, an increase in voltage B+ that occurs when frequency $f_H$ increase causes the average value of voltage $V_{cs}$ to increase. The feedback loop that includes amplifier 64 causes a corresponding increase in the amplitude of the parabolic voltage component of voltage $V_{cs}$ so as to maintain constant the ratio between the AC and DC voltage components of voltage $V_{cs}$.

Voltage $-V_0$ is generated by negatively rectifying the voltage across a secondary winding W16a of transformer T15, when transistor switch 56 is conductive. As described before, voltage B+ that is coupled to winding W16 increases, when frequency $f_H$ is increased. Therefore, the voltage that is developed across windings W16 and W16a when switch 56 is conductive decreases, causing voltage $-V_0$, that is directly proportional to the voltage across winding W16, to become less negative.

Voltage $-V_0$ is coupled to the collector electrode of transistor 62b. As explained before, voltage $-V_0$ becomes more negative as frequency $f_H$ decreases. The voltages at the emitter and collector of transistor 62b track each other when frequency $f_H$ decreases. Therefore, the power dissipation in transistor 62b remains, advantageously, low as frequency $f_H$ decreases.

Figure 4:
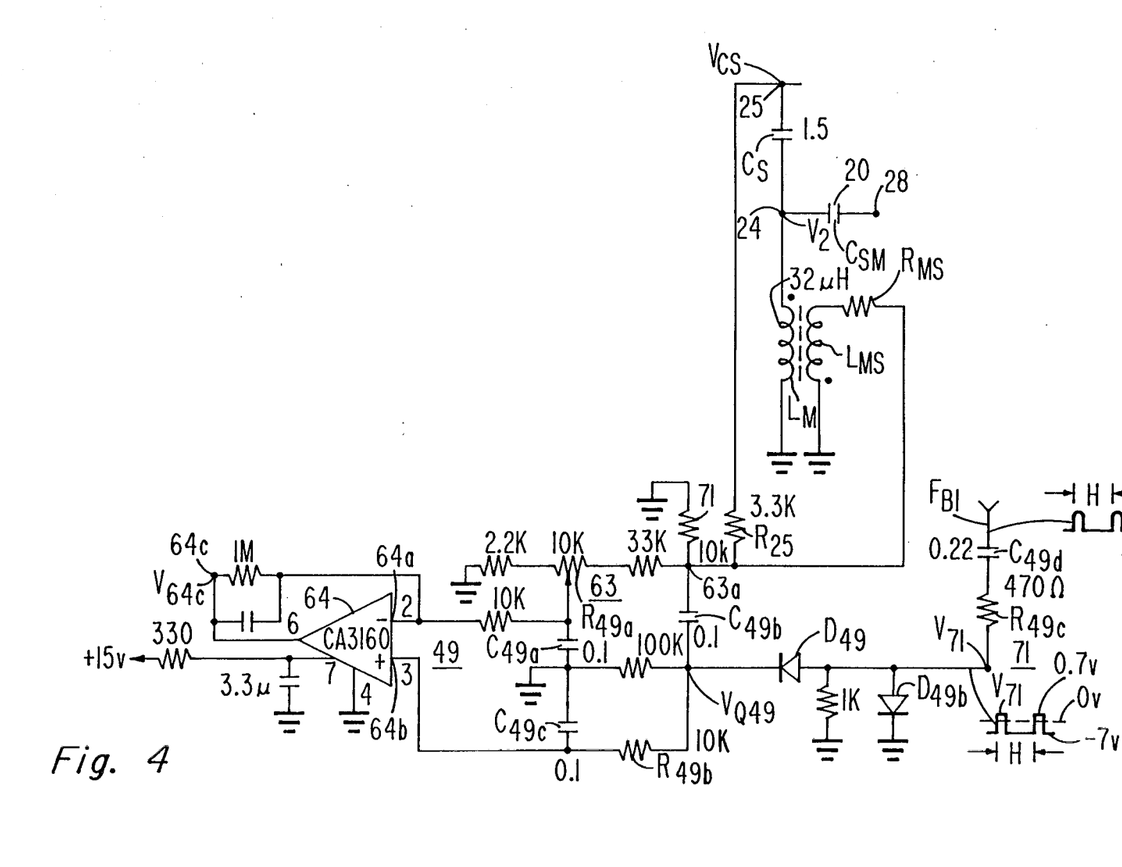
FIG. 4 illustrates a second embodiment of a portion of the deflection system of FIG. 1.

FIG. 4 illustrates a second embodiment of a portion of deflection system 122 of FIG. 1. Similar numbers and symbols in FIGS. 1, 2a–2e, 3a–3e and 4 indicate similar items or functions. In the circuit of FIG. 4, instead of using transistor Q49 of FIG. 1, a secondary winding $L_{MS}$ is magnetically coupled to modulation inductor $L_M$. The voltage across winding $L_{MS}$ is in opposite phase to the voltage at terminal 24 across inductor $L_M$. The voltage across winding $L_{MS}$ is coupled via a resistor $R_{MS}$ to terminal 63a for subtracting that portion of the voltage at terminal 63a that is derived from voltage $V_2$ at terminal 24 of pincushion correction circuit 30. Thus, retrace pulses that are present at terminal 24 do not appear at terminal 63a because of the substantial cancellation that is obtained.

In normal operation of system 122, the amplitude of current $i_Y$ is larger than that of current $i_Y'$. Under transient conditions, such as when power is first applied, auxiliary current $i_Y'$ of system 122 of FIG. 1 may have an amplitude that is larger than deflection current $i_Y$, causing the parabolic waveform of voltage $V_{cp}$ to be 180° out-of-phase, or inverted, relative to the required phase such as shown in FIG. 2c. An inverted waveform of voltage $V_{cp}$ of FIG. 1 will not provide the required S-correction and may cause deflection system 122 of FIG. 1 to be indefinitely locked into such faulty state. Should such a situation arise, it may be desirable to cause deflection system 122 to revert to a normal operating state, in which voltage $V_{cp}$ has a waveform phase such as shown in, for example, FIG. 2c.

The reversion to a normal operating state may be accomplished by coupling the anode of diode D49 in FIG. 4, for example, to a biasing network 71, embodying still another aspect of the invention. Biasing network 71 generates at the anode of diode D49 a signal $V_{71}$ that is a substantially rectangular waveform at the frequency $f_H$. Signal $F_{B1}$, at frequency $f_H$, that is developed across winding W2 of FIG. 1, is coupled via a capacitor $C_{49d}$ and a resistor $R_{49c}$ of FIG. 4 to the anode of diode D49. During retrace, signal $V_{71}$ is at +0.7 volts due to conduction of diode D49b and voltage $V_{Q49}$ is at ground potential due to conduction of diode D49. During trace, signal $V_{71}$ is at approximately $-7$ volts, causing diodes D49 and D49b to be nonconductive.

In normal operation, parabolic voltage $V_{Q49}$ of FIG. 4 is clamped to zero volts by diode D49 at both the beginning and end times of trace. At the center of trace, parabolic voltage $V_{Q49}$ of, for example, FIG. 2e is more positive than at either the beginning or end times of trace. Therefore, the voltage at terminal 64b is positive.

On the other hand, during faulty operation in which the amplitude of current $i_Y'$ is larger than that of current $i_Y$, the parabola is inverted. Therefore, at the center of trace, voltage $V_{Q49}$ is negative. It follows that the DC voltage at terminal 64b is negative. Consequently, control circuit 49 causes voltage B− of FIG. 1 to become less negative. The less negative voltage B− causes the amplitude of current $i_Y'$ to be smaller than that of current $i_Y$. The result is, in accordance with an aspect of the invention, that deflection system 122 reverts to operating in the normal operation mode in which parabolic voltage $V_{Q49}$ is more positive at the center of trace than at either the beginning or end time of trace.

Referring to FIG. 1, as explained before, signal $V_{Hd}$ that controls the phase of deflection current $i_Y$ is delayed relative to signal $V_{Hnd}$ that controls the phase of auxiliary current $i_Y'$. Such delay is adjusted by adjusting a variable resistor 21a of unit 21.

In accordance with a feature of the invention, such adjustable delay causes the turn-off time of cascode switch arrangement 23 to be delayed relative to that of arrangement 23'. Because of the delay in the turn-off time of switch arrangement 23, the phase of auxiliary current $i_Y'$ slightly leads deflection current $i_Y$ by phase that is adjustable. Such leading phase of current $i_Y'$ causes voltage $V_{cs}$ in capacitor $C_s$ to be higher at the end of trace than at the beginning of trace. The result is that parabolic voltage $V_{cp}$ becomes nonsymmetrical, or "tilted", relative to the center of trace. Such "tilting" of parabolic voltage $V_{cp}$ reduces, in a known manner, scanning related distortions such as asymmetrical nonlinearity error in current $i_Y$ caused by deflection losses.

When frequency $f_H$ is low, the amplitude of current $i_Y'$ is sufficiently large to provide the required "tilting" of parabolic voltage $V_{cp}$. On the other hand, when frequency $f_H$ is high, current $i_Y'$ is smaller, as described before; therefore, the effect of current $i_Y'$ on voltage $V_{cp}$ and, in particular, on the "tilting" of voltage $V_{cp}$ is smaller. When frequency $f_H$ is high, nonsymmetrical linearity error is corrected by linearity inductor $L_{LIN}$ that is adjusted, when frequency $f_H$ is high for reducing nonlinearity error. Thus, advantageously, the phase shift of current $i_Y'$ relative to current $i_Y$, causes current $i_Y'$ to maintain nonlinearity error correction within the frequency range of frequency $f_H$.

What is claimed:

1. A deflection apparatus for generating a deflection current in a deflection winding, said apparatus being capable of generating said deflection current at any frequency selected from a range of frequencies such that S-correction is automatically provided at the selected frequency, comprising:

a source of an input signal at a frequency that is related to the selected frequency;

switching means responsive to said input signal and coupled to said deflection winding for producing said deflection current at the selected frequency;

an S-capacitance for developing a parabolic voltage that is coupled to said deflection winding to provide S-correction, such that the value of the S- capacitance that substantially contributes to providing said S-correction remains substantially unchanged at any selected frequency within said range; and a source of current for generating a generally sawtooth first current that is coupled to said S-capacitance to control the amplitude of said parabolic voltage, said first current having an amplitude that is proportional to the selected frequency such that when the selected frequency changes, S-correction is automatically maintained by a corresponding change in the amplitude of said first current.

2. A deflection apparatus according to claim 1 wherein said first and deflection currents are combined in said S-capacitance to produce said parabolic voltage in said S-capacitance.

3. A deflection apparatus according to claim 2 wherein said first current generating means generates said first current in such a way that the currents that are combined in said S-capacitance are at substantially opposite phases.

4. An apparatus according to claim 3 further comprising, means responsive to said parabolic voltage for maintaining the ratio between the average level and the peak-to-peak amplitude of said parabolic voltage substantially the same for any frequency that is selected within said range of frequencies.

5. A deflection apparatus according to claim 1 further comprising delay means for delaying one of said first and deflection currents relative to the other one.

6. An apparatus according to claim 1 further comprising, means coupled to said S-capacitance and responsive to said input signal for maintaining the average value of said parabolic voltage proportional to the frequency that is selected to produce said deflection current at substantially the same amplitude at any frequency that is selected within said range of frequencies.

7. A deflection apparatus according to claim 1 further comprising a source of an energizing first voltage coupled to said switching means for controlling the amplitude of said deflection current, said first voltage having a magnitude that changes when said selected frequency changes.

8. A deflection apparatus according to claim 7 further comprising a feedback control circuit for controlling said first voltage in accordance with the amplitude of said deflection current.

9. A deflection apparatus according to claim 1 further comprising a source of an energizing voltage coupled to said source of said first current for controlling the amplitude of said first current, said second voltage having a magnitude that changes when said selected frequency changes.

10. A deflection apparatus according to claim 1 wherein said source of said first current comprises an inductance, a second capacitance and second switching means that is responsive to said input signal and that operates at said selected frequency, said second switching means being coupled to said inductance and to said second capacitance that form a resonant circuit when said second switching means is nonconductive for generating in said inductance of said resonant circuit said first current.

11. A deflection apparatus according to claim 10 further comprising a coupling capacitor for capacitively coupling said first current to said S-capacitance.

12. A deflection apparatus according to claim 11 wherein when said second switching means is conductive, a voltage that is equal substantially to the sum of said parabolic voltage and of the voltage across said coupling capacitor is applied across said inductance.

13. A deflection apparatus according to claim 1 further comprising means for generating a signal that is indicative of the amplitude of said deflection current and a power supply responsive to said signal that is indicative of the amplitude of said deflection current for generating a supply voltage that is coupled to said deflection winding and that maintains the amplitude of said deflection current the same at said any frequency that is selected within said rang of frequencies.

14. A deflection apparatus according to claim 13 further comprising a transformer having a winding that is coupled to said supply voltage for developing at a second winding of said transformer a second voltage that is coupled to said source of said first current to control, in accordance with said second voltage, the amplitude of said first current.

15. A deflection apparatus according to claim 1 further comprising means for establishing a relatively small phase shift between said first current and said deflection current to develop said parabolic voltage that is nonsymmetrical.

16. A deflection apparatus according to claim 1 further comprising means responsive to said parabolic voltage for developing a first signal that is indicative of the peak-to-peak amplitude of said parabolic voltage, wherein said source of said first current is responsive to said first signal that controls the amplitude of said first current.

17. A deflection apparatus according to claim 16 wherein said first signal developing means develops said first signal at a first polarity when the amplitude of said deflection current is larger than that of said first current and at an opposite polarity when the amplitude of said deflection current is smaller than that of said first current and wherein said source of said first current controls in accordance with the polarity of said first signal the amplitude of said first current such that in steady state said first signal is at said first polarity.

18. A deflection apparatus according to claim 1 further comprising an east-west pincushion correction circuit that includes a modulation inductance coupled to said S-capacitance such that said first current is coupled at a junction between said S-capacitance and said modulation inductance.

19. A deflection apparatus for generating a deflection current in a deflection winding, said apparatus being capable of generating said deflection current at any frequency selected from a range of frequencies such that S-correction is automatically provided at the selected frequency, comprising:

a source of an input signal at a frequency that is related to the selected frequency;

switching means responsive to said input signal and coupled to said deflection winding for producing said deflection current at the selected frequency;

an S-capacitance coupled to said deflection winding for developing a parabolic voltage that provides the S-correction; and means for generating a generally sawtooth first current that is coupled to said S-capacitance at an amplitude that is proportional to the selected frequency such that when the selected frequency changes, the amplitudes of said first current and said parabolic voltage change proportionally to the change in the selected frequency, wherein a gradual change in the selected frequency produces, throughout said range of frequencies, a correspondingly gradual change in the amplitude of said parabolic voltage such that said change in the amplitude of said parabolic voltage maintains the required S-correction at the selected frequency that results from said gradual change in the selected frequency.

20. A deflection apparatus for generating a deflection current in a deflection winding, said apparatus being capable of generating said deflection current at any frequency selected from a range of frequencies such that S-correction is automatically provided at the selected frequency, comprising:

a source of an input signal at a frequency that is related to the selected frequency;

switching means responsive to said input signal and coupled to said deflection winding for producing said deflection current at the selected frequency;

an S-capacitance coupled to said deflection winding;

a resonant circuit that includes an inductance;

second switching means responsive to said input signal and coupled to said inductance for producing in said inductance an AC first current that is coupled to said S-capacitance and that develops in said S-capacitance an S-correction providing parabolic voltage at an amplitude that is determined in accordance with the amplitude of said first current; and means responsive to said input signal and coupled to said inductance for controlling the amplitude of said first current in accordance with said frequency of said input signal such that when the selected frequency changes, S-correction is automatically maintained by a corresponding change in the amplitude of said first current.

* * * * *